July 14, 1931.   A. B. CUMMINS   1,813,916
PRODUCTION OF FINELY DIVIDED MATERIAL
Filed April 29, 1929
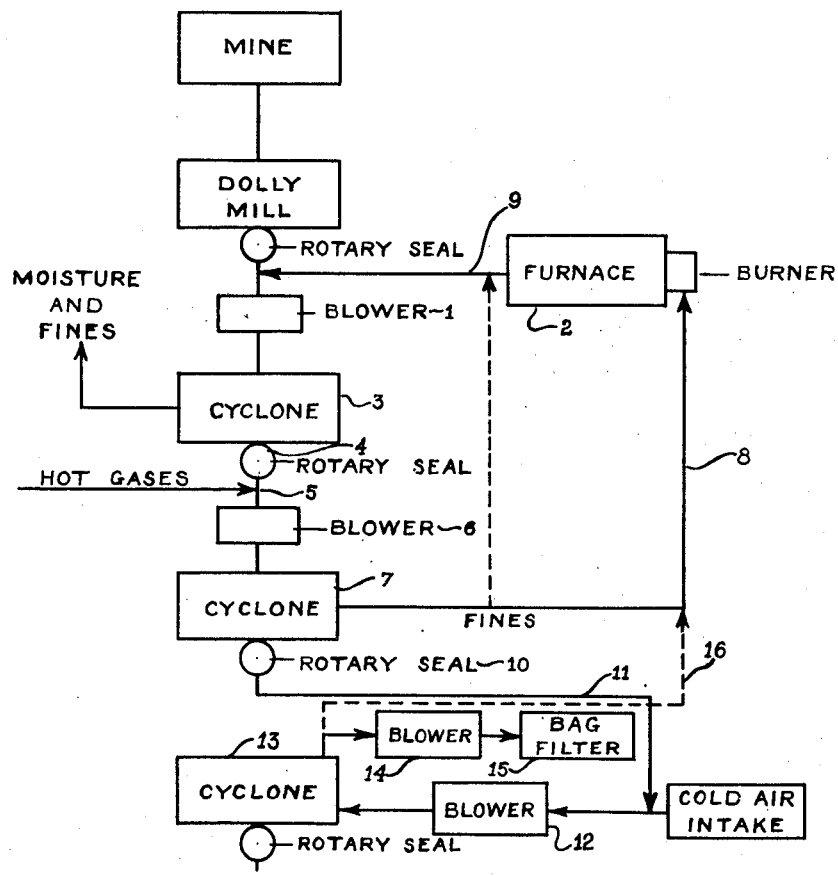
ARTHUR B. CUMMINS
INVENTOR.
BY Walter H. Borcherding
ATTORNEY.

Patented July 14, 1931

1,813,916

UNITED STATES PATENT OFFICE

ARTHUR B. CUMMINS, OF LOMPOC, CALIFORNIA, ASSIGNOR TO CELITE CORPORATION, OF NEW YORK, N. Y., A CORPORATION OF NEW YORK

PRODUCTION OF FINELY DIVIDED MATERIAL

Application filed April 29, 1929. Serial No. 358,864.

The present invention relates to an improved method and apparatus for producing powdered or finely divided products from mineral material and the like, and particularly to such products wherein the sizes of the individual particles comprised therein have certain determinable optimum limits, and to the novel products thus produced. More particularly, the invention relates to controlling the particle size of finely divided diatomaceous earth and effecting this control in such a manner as to render such earth more suitable for use as a filter aid, or for other purposes similar to this one in that a definite range of particle sizes is desirable.

While certain features of my invention are of general applicability, its primary object is the production of more efficient filter-aids from diatomaceous earth and the invention is therefore hereinafter described specifically as it is applied for the attainment of this object.

Diatomaceous earth, otherwise known as kieselguhr, infusorial earth, fossil silica, etc., is in common use as a filter-aid and it has also been recognized that its suitability for this purpose is greatly enhanced by maintaining the size of the individual particles of the filter-aid within certain limits. (U. S. Patent 1,632,458—Thatcher.) Definite control of the particle size of the diatomaceous earth has also been found to be highly advantageous in rendering it suitable for other purposes, as for instance adapting it for use as an admixture for concrete. (U. S. reissue Patent 16,732—Wig.) The manufacture of diatomaceous earth into a finely divided product suitable for use for these purposes is commonly effected by means of disintegrators such as swing hammer mills which disintegrate the coarse earth into fine particles of indiscriminate sizes and from which the disintegrated material is carried pneumatically to pneumatic separators such as cyclones wherein a classification of the disintegrated material is effected. Suitable apparatus for carrying out this operation is shown and described in U. S. Patent 1,611,791—Stockton. In the production of finely divided diatomaceous earth products having predetermined particle size limits by known methods, serious difficulty has been encountered in disposing of the excessively finely divided or "fines" fraction of the disintegrated material when the amount of fines is above the optimum limit determined by the particular purpose for which the finely divided diatomaceous earth or similar material is to be used. The presence of these fines in amounts above certain limits has been found especially disadvantageous in certain types of filter-aids.

According to my invention the disadvantages incident to the disposition of this excessively finely divided material are obviated by subjecting it to a heat or calcining treatment adapted to produce fritting of the fine particles. This treatment is preferably effected by passing the gas in which the excessively fine material is carried in the form of dust through a heated zone maintained at a suitable temperature and then pneumatically conveying the fritted material into contact and admixing it with diatomaceous earth or other material entering the process.

The various features and advantages of my invention will be apparent from the following description of its application to the production of filter-aids from diatomaceous earth taken in connection with the accompanying drawing which represents diagrammatically a suitable arrangement of apparatus for carrying out the process. Referring to the drawing, the earth, which is mined as a "chalky" rock is first coarsely milled by being passed thru a "dolly mill" or equivalent machine for coarse grinding. The fineness of earth produced by this mill is about as follows:

Sieve analysis (Tyler standard screen)

| Mesh | Per cent |
|---|---|
| on 3 | 6.5 |
| on 6 | 10.0 |
| on 10 | 8.7 |
| on 20 | 7.7 |
| on 100 | 10.4 |
| thru 100 | 56.7 |

Since diatomaceous earth as mined always contains considerable water (that mined at Lompoc, California, averaging 45%) one of the first desirable steps is to eliminate the major part of the water content. From the dolly mill, the material is passed thru a rotary seal into a pipe thru which a stream of hot products of combustion are being drawn by means of blower 1 from a suitable source such as an oil or gas fired furnace 2. The coarsely ground diatomaceous earth is drawn into blower 1 with the hot gases and there subjected to the impact of the rapidly revolving vanes of the fan in the blower. The impact is so great that the earth is disintegrated into practically the individual diatoms of which it is composed. However, the percentage of fines (broken diatoms) is less than it would be under any other system of commercial disintegration. Simultaneous evaporation of a portion of the water present also takes place in the first blower. The disintegrated hot earth with the steam generated in the blower is then passed into a pneumatic separator such as cyclone separator 3, the top of which is open. Nearly all of the diatomaceous earth falls to the bottom of this first cyclone, the mixed steam, products of combustion and some of the very finest earth escaping from the open top to the atmosphere. The latter is not great under proper operating conditions, there being only enough to cause a slight haze over the cyclone during operation.

The material being now finely divided and fairly dry is sucked from the bottom of the first cyclone 3 thru a rotary seal 4 and then thru a pipe or drying chamber 5 to blower 6. In its passage thru the pipe 5, the material is preferably mixed with a fresh supply of hot combustion gases derived from a suitable source to complete the drying. Blower 6 operates at a speed about equal to that of the first and it serves to complete the disintegration of the diatomaceous earth or masses of conglomerated diatoms which have escaped this process in the first blower It also assists in the completion of the drying operation. The percentage of objectionable fines is, however, also increased so that due to increased dryness and increased fines, there is a great deal of excessively finely divided material present in suspension in the gas leaving this blower.

The gas is then introduced into cyclone 7 wherein a product consisting of particles of the requisite sizes for filtration or other desired purpose is pneumatically separated from the suspended matter thereby leaving the gas with excessively finely divided material suspended therein. If the gas containing the fines was allowed to escape from cyclone 7 into the open air, a serious dust nuisance would be created and further, the ejected material would constitute an economic loss.

For the treatment of the fines, according to my invention, I provide a pipe 8 from the top of cyclone 7 to a high temperature zone as for example to the furnace 2 at the beginning of the system or to a duct leading from this furnace or to any suitable external source of heat. This furnace is preferably of the type which operates on fuel oil which is introduced at one end together with the required amount of air. The pipe is so arranged that the fines are fed either directly into the flame of this furnace (this being not higher than about 2600° F.) or into a zone of temperature in excess of about 1600° F. and preferably not higher than about 2600° F. with the result that the fines are momentarily subjected to an intense heat, thereby calcining, fritting, and stiffening them as well as causing a separation of chemically combined water. Some of the particles are agglomerated together to form larger particles, some of them are improved only in that their capacity for rehydration is destroyed. It has been found that gelatinous silica or silicates have a greatly reduced capacity to take up water after the silica has been highly heated. The fines, therefore, are prevented by the calcination in the flame from swelling during filtration to form a gel which would retard that process. The above treatment of the excessive fines results in the removal of most of their undesirable qualities as regards filtration.

The movement of the fines from cyclone 7 to the furnace is accomplished by the pressure of the second blower and the suction of the first. The fines introduced into the furnace are sucked into the system once more by the first blower and admixed with the incoming material.

A considerable accumulation of a portion of the fines may occur in the main furnace, after a long period of operation under unbalanced draft conditions, and this material may be raked or shoveled out from time to time and so recovered. The accumulation of fines in the furnace may be obviated by connecting pipe 8 directly to pipe 9 thru which the hot gases from the furnace exit as is shown in dotted lines on the drawing, by reason of the increased velocity of the combustion gases passing thru this pipe compared with their velocity while in the furnace. The fines accumulated in the furnace may be used as a filler, paint extender, etc., or may be added to a different grade of diatomaceous filter-aid than the one from which it was taken during the processing. The material deposited in the bottom of cyclone 7 may be withdrawn from the system or if further refinement of this product is desired it is transferred to a third cyclone 13 thru rotary seal 10, pipe 11, and blower 12. The pipe serving for the transfer is provided with an intake orifice for cold air, so that the temperature of the material handled may be reduced and also furnish more air for pneumatic conveying purposes. The third blower and the third cyclone are similar in design to the two previous ones, except that the fines taken from the top of the third cyclone are preferably blown into a bag filter 15 by means of blower 14. The recovery of these fines in a bag filter may be omitted and if desired these fines might also be returned with the fines from the cyclone 7 back to the furnace. In such a case they would be blown into the fines return line by the pipe 16 indicated by dotted lines between cyclone 13 and the main fines-return pipe 8. A third blower and cyclone are not always necessary for production of a satisfactory product and may be omitted in such cases.

The material deposited in the bottom of the third (or second) cyclone constitutes a good filter-aid assuming that proper operating conditions are maintained and may be used as such without any further treatment. In such case, it would be passed directly from the third (or second) cyclone to the packing machine.

In the production of filter-aids from diatomaceous earth the operation preferably is carried out by suitable control of the blowers and feed so that the powder deposited from cyclone 2 or 3 as the case may be contains less than 20% of particles which are smaller in size than a particle which corresponds in rate of fall in distilled water, to a particle of an average diameter of one micron (Oden method). Extreme fines present in the finely ground material in excess of this amount are subjected to a heat treatment in accordance with my invention and thereby rendered suitable for admixture with incoming finely ground material.

It is to be understood that the apparatus utilized for the practice of my invention may vary considerably from the particular design illustrated which is of the same general type as that disclosed in U. S. Patent 1,611,791—Stockton, and which has been found to be especially advantageous for the production of filter-aids from diatomaceous earth. The apparatus shown may be both simplified and elaborated without departing from my invention which is not limited except as indicated in the annexed claims.

Furthermore my invention is not limited to the treatment of excessively finely divided particles produced during the production of powders from diatomaceous earth, nor is the invention limited to a system wherein the heat treated fines are admixed with incoming finely ground material. In general the invention may be applied to the treatment of any gas carrying suspended therein finely divided material which may be agglomerated and fritted by passing the gas into a suitable high temperature zone, and the resultant heat treated product may be either returned to the system as described above in connection with the production of filter aids from diatomaceous earth or collected by settling, or by means of cyclones, etc., and disposed of in any suitable manner as for example as waste. In the latter case the apparatus provided by the invention would constitute primarily means for abating the nuisance caused by the promiscuous discharging of gases carrying finely divided material into the atmosphere.

In certain instances it may be desirable to admix a small amount of fluxing agents with the excessively finely divided material prior to the fritting thereof to facilitate fritting and agglomeration of the small particles. Various materials may be used for this purpose depending upon their availability and the character of the fines. Fluxing agents including salts of alkaline forming metals, that is alkaline earth and alkali metals such as sodium chloride, borax, and soda ash have been found to be especially suitable in the treatment of diatomaceous earth. The fluxing agent may be introduced at any convenient step prior to the fritting treatment. For example it may be introduced into pipe 8, or in case the presence of the fluxing agent is unobjectionable or desirable in the product withdrawn from the cyclones 7 and 13 the fluxing agent may be introduced into the pipe leading into blower 1 thereby effecting an intimate admixture of the fluxing agent and treated material.

What I claim is:

1. The process of preparing a finely divided product from finely divided diatomaceous earth of indiscriminate particle sizes which comprises separating the indiscriminately sized particles into a product consisting of particles of the requisite sizes and a fraction containing excessively finely divided material, heating said fraction containing excessively finely divided material sufficiently to cause fritting of the particles comprised therein, and returning the material thus treated to further quantities of the finely divided diatomaceous earth of indiscriminate particle sizes prior to its subjection to the separating operation.

2. The process of preparing a finely divided product from finely divided diatomaceous earth of indiscriminate particle sizes which comprises pneumatically separating the finely divided material into a product consisting of particles of the requisite sizes and a fraction containing excessively finely divided material, heating said fraction containing excessively finely divided material sufficiently to cause fritting of the particles therein, and returning the material thus treated to further quantities of the finely divided diatomaceous earth of indiscriminate particle sizes prior to its subjection to the separating operation.

3. The process of preparing a finely divided product from finely divided diatomaceous earth of indiscriminate particle sizes which comprises subjecting the finely divided material to a pneumatic separation operation whereby a product is produced consisting of particles of the requisite sizes and a gas carrying excessively finely divided material suspended therein, introducing said gas into a heated zone adapted to cause fritting of the suspended material, withdrawing the gas having the fritted particles suspended therein from said heated zone and admixing therewith further quantities of finely divided earth of indiscriminate particle sizes and subjecting the gas containing the admixture to said pneumatic separation operation.

4. In a process for producing a finely divided product from mineral material or the like comprising disintegrating the crude material into fine particles of indiscriminate sizes, pneumatically classifying the finely divided product into a product having the desired particle size characteristics and excessively finely divided material, the improvement which consists in subjecting the excessively finely divided material to a heat treatment adapted to cause fitting thereof, and admixing the material thus treated with additional quantities of finely divided earth prior to the pneumatic classification thereof.

5. In a process for producing a finely divided product from mineral material and the like comprising disintegrating the coarse earth into fine particles of indiscriminate sizes, pneumatically separating from the finely divided product the desired product thereby producing a gas carrying extremely finely divided material or dust suspended therein, the improvement which consists in passing said gas through a heated zone adapted to cause fritting of the suspended particles, withdrawing the gas containing the fritted particles from said zone and admixing with said gas further quantities of said fine particles of indiscriminate sizes, and subjecting the gas containing the admixture to said separation operation.

6. The process of preparing a filter-aid containing a relatively low quantity of excessively finely divided material from finely divided diatomaceous earth of indiscriminate particle sizes which comprises subjecting the finely divided material to a pneumatic separation operation whereby a product is produced containing less than about 20% of particles which are smaller in size than a particle which corresponds in rate of fall in distilled water to a particle of the same density and of an average diameter of one micron, and a gas carrying excessively finely divided material suspended therein, introducing said gas into a heated zone adapted to cause fritting of the suspended material, withdrawing the gas having the fritted particles suspended therein from said heated zone and admixing therewith further quantities of finely divided earth of indiscriminate particle sizes, and subjecting the gas containing the admixture to said pneumatic separation operation.

7. An apparatus for the production of finely divided products which comprises a disintegrator for reducing the crude material into fine particles of indiscriminate sizes, means for pneumatically separating the finely divided material into the desired product and a gas containing in suspension therein excessively finely divided material, heating means for heating said gas sufficiently to frit the suspended material, and means for pneumatically conveying the fritted material into admixture with incoming finely divided material consisting of particles of indiscriminate sizes.

8. In apparatus for production of finely divided material comprising a disintegrator for reducing coarse material to a finely divided form, a pneumatic separator for separating the finely divided material into the desired product and a gas carrying excessively finely divided material in suspension therein, and means for returning said gas together with the suspended material to the system for admixture with incoming disintegrated material, the improvement which consists in the combination with said gas return means of means of heating said gas prior to its admixture with incoming material to a temperature adapted to produce fritting of the suspended material.

9. In apparatus for the milling, drying, and separating of coarsely ground moist mineral material such as diatomaceous earth and the like comprising a blower for reducing said material to a finely divided form and suspending said material in a gas, a pneumatic separator for separating the suspended material into the desired product and a gas containing excessively finely divided material suspended therein, and means for returning said last mentioned gas and material suspended therein to the system for admixture with incoming disintegrated material, the improvement which consists in the combination, with said gas return means of means for admixing combustion gases with the returned gas prior to its admixture with incoming disintegrated material to produce fritting of the suspended material and to subsequently dry said incoming material admixed therewith.

10. In the pneumatic treatment of finely divided material the method of abating the dust nuisance due to the production of gases carrying finely divided material suspended therein which comprises maintaining a heated zone at a temperature sufficient to frit and agglomerate the finely divided material and passing said gases thru said zone.

11. In the pneumatic treatment of finely divided material the method of abating the dust nuisance due to the production of gases carrying finely divided material suspended therein which comprises admixing with said gases a sufficient amount of hot combustion gases to frit and agglomerate the suspended material.

12. In a process for producing a finely divided product from mineral material and the like comprising disintegrating the coarse earth into fine particles of indiscriminate sizes, pneumatically separating from the finely divided product the desired product thereby producing a gas carrying extremely finely divided material or dust suspended therein, the improvement which consists in admixing a fluxing agent with said gas, in passing said gas through a heated zone adapted to cause fritting of the suspended particles, withdrawing the gas containing the fritted particles from said zone and admixing with said gas further quantities of said fine particles of indiscriminate sizes, and subjecting the gas containing the admixture to said separation operation.

13. In a process for producing a finely divided product from mineral material and the like comprising disintegrating the coarse earth into fine particles of indiscriminate sizes, pneumatically separating from the finely divided product the desired product thereby producing a gas carrying extremely finely divided material or dust suspended therein, the improvement which consists in admixing a fluxing agent with said gas and then passing said gas thru a heated zone adapted to cause fritting of the suspended particles.

Signed at Lompoc, in the county of Santa Barbara and State of California, this 18th day of April 1929.

ARTHUR B. CUMMINS.